US008830716B2

(12) United States Patent
Feekes

(10) Patent No.: US 8,830,716 B2
(45) Date of Patent: Sep. 9, 2014

(54) INTELLIGENT FAR MEMORY BANDWITH SCALING

(71) Applicant: Dannie G. Feekes, Eldorado Hills, CA (US)

(72) Inventor: Dannie G. Feekes, Eldorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 110 days.

(21) Appl. No.: 13/631,938

(22) Filed: Sep. 29, 2012

(65) Prior Publication Data

US 2014/0092678 A1    Apr. 3, 2014

(51) Int. Cl.
*G11C 5/06*        (2006.01)
*G06F 12/08*      (2006.01)
*G06F 12/06*      (2006.01)

(52) U.S. Cl.
CPC ............ *G06F 12/08* (2013.01); *G06F 12/0806* (2013.01); *G06F 12/0813* (2013.01); *G06F 12/0802* (2013.01); *G06F 12/0646* (2013.01); *G06F 12/06* (2013.01); *G06F 12/0638* (2013.01); *G06F 12/0676* (2013.01); *G06F 12/0692* (2013.01)
USPC ............. 365/63; 711/118; 711/170; 711/173; 711/167; 711/122

(58) Field of Classification Search
CPC . G06F 12/08; G06F 12/0806; G06F 12/0813; G06F 12/0802; G06F 12/0646; G06F 12/0692; G06F 12/0676; G06F 12/0638
USPC ............. 365/63; 711/118, 170, 173, 167, 122
See application file for complete search history.

(56) References Cited

U.S. PATENT DOCUMENTS

| | | | | |
|---|---|---|---|---|
| 5,905,889 | A * | 5/1999 | Wilhelm, Jr. ................. | 718/104 |
| 7,065,763 | B1 * | 6/2006 | Martin et al. ................. | 718/102 |
| 7,486,575 | B2 * | 2/2009 | Park ............................. | 365/193 |
| 7,966,455 | B2 * | 6/2011 | Borkenhagen ............... | 711/128 |
| 7,975,108 | B1 * | 7/2011 | Holscher et al. ............. | 711/137 |
| 8,074,034 | B2 * | 12/2011 | Sartore ........................ | 711/162 |
| 8,135,890 | B2 * | 3/2012 | Woo et al. .................... | 710/100 |
| 8,214,599 | B2 * | 7/2012 | de la Iglesia et al. ........ | 711/137 |
| 8,214,608 | B2 * | 7/2012 | de la Iglesia et al. ........ | 711/156 |
| 8,285,961 | B2 * | 10/2012 | Sikdar et al. ................. | 711/170 |
| 8,286,161 | B2 * | 10/2012 | Togawa et al. ................ | 718/1 |
| 8,402,198 | B1 * | 3/2013 | de la Iglesia et al. ........ | 711/3 |
| 8,490,106 | B2 * | 7/2013 | Imura .......................... | 718/104 |
| 8,612,676 | B2 * | 12/2013 | Dahlen et al. ................ | 711/113 |
| 8,612,809 | B2 * | 12/2013 | Casper et al. ................ | 714/708 |
| 2012/0047312 | A1 * | 2/2012 | Nathuji et al. ................ | 711/6 |
| 2012/0166891 | A1 * | 6/2012 | Dahlen et al. ................ | 714/54 |
| 2012/0284436 | A1 * | 11/2012 | Casper et al. ................ | 710/74 |
| 2013/0151777 | A1 * | 6/2013 | Daly et al. ................... | 711/122 |
| 2014/0006684 | A1 * | 1/2014 | Ramakrishnan ............. | 711/102 |

\* cited by examiner

*Primary Examiner* — Viet Q Nguyen
(74) *Attorney, Agent, or Firm* — Blakely, Sokoloff, Taylor & Zafman LLP

(57) ABSTRACT

Memory bandwidth management. In a two-level memory (2LM) system far memory bandwidth utilization at least a far memory is monitored and the available far memory bandwidth availability is dynamically modified based on monitored far memory bandwidth utilization. The operational state of at least one processing core is dynamically modified in response to modification of available far memory bandwidth.

20 Claims, 4 Drawing Sheets

INTELLIGENT FAR MEMORY BANDWITH SCALING

TECHNICAL FIELD

Embodiments of the invention relate to memory bandwidth management. More particularly, embodiments of the invention relate to techniques for managing bandwidth in a multi-level memory subsystem.

BACKGROUND

Computing systems and devices typically include adequate main memory, consisting of dynamic random access memory (DRAM), to store a subset of the contents of system nonvolatile disk storage. Main memory is used to reduce latency and increase bandwidth for the system processor to store and retrieve memory operands from disk storage.

DRAM packages such as dual in-line memory modules (DIMMs) are limited in terms of their memory density, and are also typically expensive with respect to nonvolatile memory storage. Currently, to increase the size of system main memory requires multiple DIMMs, which increases the cost and volume of the system. Increasing the volume of a system adversely affects the form factor of the system (e.g., large DIMM memory ranks are not ideal in the mobile client space).

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Techniques for bandwidth management are described herein. In one embodiment, the bandwidth management is directed towards system main memory comprising two levels of memory (alternatively referred to herein as "2LM") that include cached subsets of system disk level storage (in addition to, for example, run-time data). This main memory includes a first level (alternatively referred to herein as "near memory") which is smaller faster memory made of, for example, DRAM; and a second level (alternatively referred to herein as "far memory") which includes larger and slower (with respect to the near memory) volatile memory (e.g., DRAM) or nonvolatile memory storage (e.g., flash memory).

In one embodiment, The far memory is presented as "main memory" to the host operating system (OS), while the near memory is a cache for the far memory that is transparent to the OS, thus rendering the embodiments described below to appear the same as prior art main memory solutions. The management of the two-level memory may be done by a combination of logic and modules executed via the host processing core. Near memory may be coupled to the host processing core via high bandwidth, low latency interconnections for efficient processing. Far memory may be coupled to the processing core via lower bandwidth, higher latency interconnection (as compared to that of the near memory).

Figure 1:
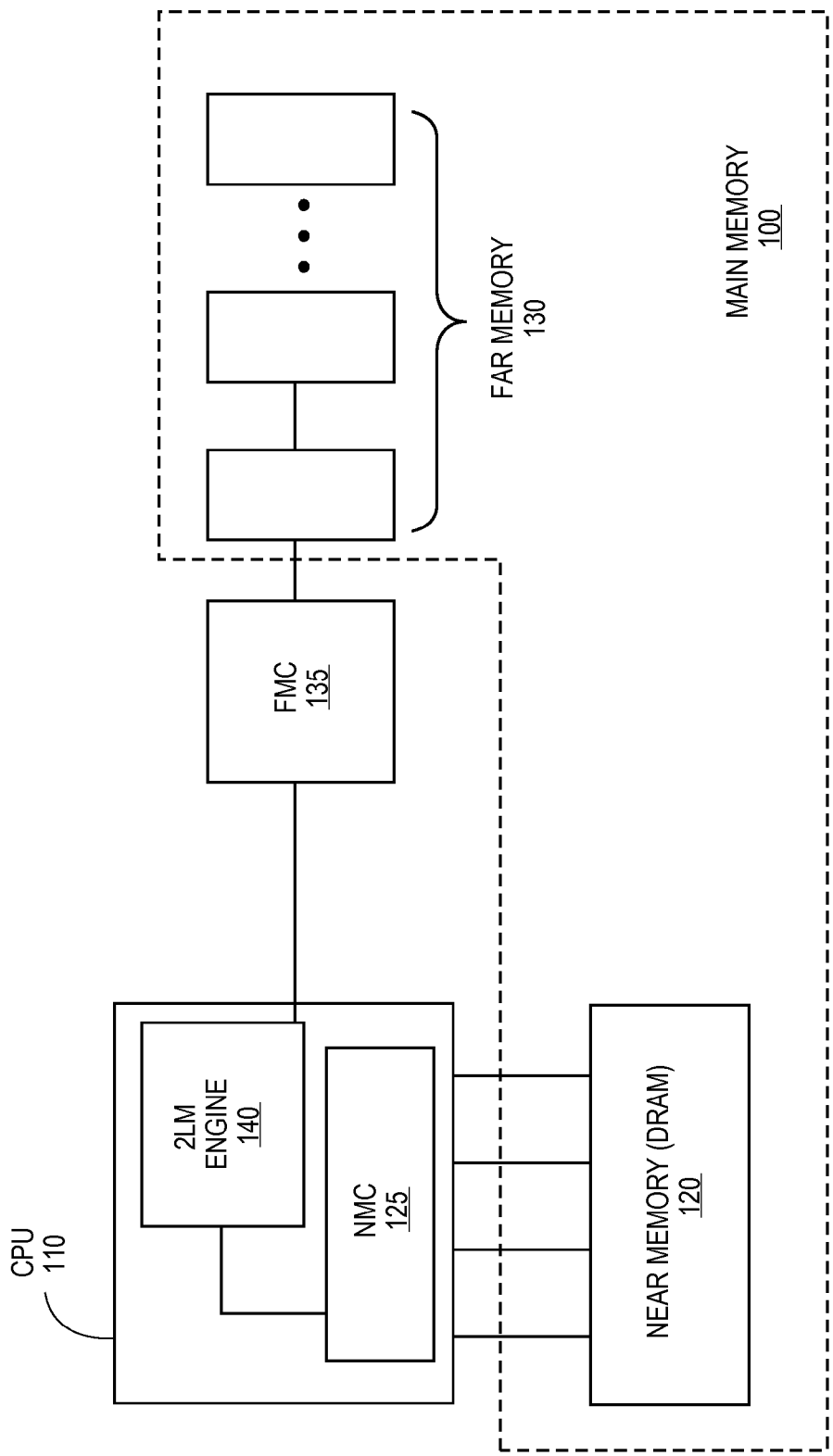
FIG. 1 is a block diagram of one embodiment of a two-level system main memory system.

FIG. 1 is a block diagram of one embodiment of a two-level system main memory system. System main memory 100 provides run-time data storage and access to the contents of system disk storage memory (not shown) to processor 110. In some embodiments, processor 110 may include cache memory, which would store a subset of the contents of main memory 100.

In one embodiment, main memory 100 includes a level of volatile memory shown as near memory (e.g., DRAM) 120, and a level of memory, shown as far memory 130. Far memory may comprise either volatile or nonvolatile memory. In this embodiment, near memory 120 serves a low-latency and high-bandwidth (i.e., for processor 110 access) cache of far memory 130, which may have lower bandwidth and higher latency (i.e., for processor 110 access).

In one embodiment, near memory 120 is managed by near memory controller (NMC) 125, while far memory 130 is managed by far memory controller (FMC) 135. FMC 135 reports far memory 130 to the host operating system (OS) as main memory (i.e., the host OS recognizes the size of far memory 130 as the size of system main memory 100). The host OS and system applications are "unaware" of the existence of near memory 120 as it is a "transparent" cache of far memory 130.

In one embodiment, processor 110 further includes 2LM engine module/logic 140. The "2LM engine" is a logical construct that may comprise hardware and/or micro-code extensions to support two-level main memory 100. For example, 2LM controller 140 may maintain a full tag table that tracks the status of all architecturally visible elements of far memory 130.

For example, when processor 110 attempts to access a specific data segment in main memory 100, 2LM controller 140 determines whether said data segment is included in near memory 120; if it is not, 2LM controller 140 fetches the data segment in far memory 130 and subsequently writes the data segment to near memory 120 (similar to a cache miss). Because near memory 120 acts as a "cache" of far memory 130, 2LM engine 140 may further execute data prefetching or similar cache efficiency processes known in the art.

2LM controller 140 may manage other aspects of far memory 130. For example, in embodiments where far memory 130 comprises nonvolatile memory, nonvolatile memory such as flash or phase change memory is subject to degradation of memory segments due to significant reads/writes. Thus, 2LM controller 140 may execute functions including wear-leveling, bad-block avoidance, and the like in a manner transparent to system software. For example, executing wear-leveling logic may include selecting segments from a free pool of clean unmapped segments in far memory 130 that have a relatively low erase cycle count.

Near memory 120 is smaller in size than far memory 130, although the exact ratio may vary based on, for example, intended system use. In this embodiment, because far memory 130 comprises denser, cheaper nonvolatile memory, main memory 100 may be increased cheaply and efficiently and independent of the amount of DRAM (i.e., near memory 120) in the system.

Power and performance modeling of a 2LM memory subsystem that has a reduced DRAM size for the first level of memory (near memory) and phase change memory for the second level (far memory), shows that the power advantage of a 2LM memory subsystem architecture is lost when the bandwidth to the far memory exceeds a given bandwidth threshold. This occurs when the power consumed in far memory transactions exceed the power difference between a 1LM architecture and a 2LM architecture configured with memory sizes that yield equal performance. In order to mitigate the impact of these outlying cases, techniques are described to dynamically scale the near memory size and bandwidth to the far memory in order to consistently yield superior power consumption over traditional 1LM memory architectures.

In some embodiments, metadata is added to all memory transactions to identify the source of the memory request. The 2LM controller maintains a record of near memory misses for each device making requests. This allows the 2LM memory controller to identify the source of any device that is causing excessive far memory bandwidth consumption.

Figure 2:
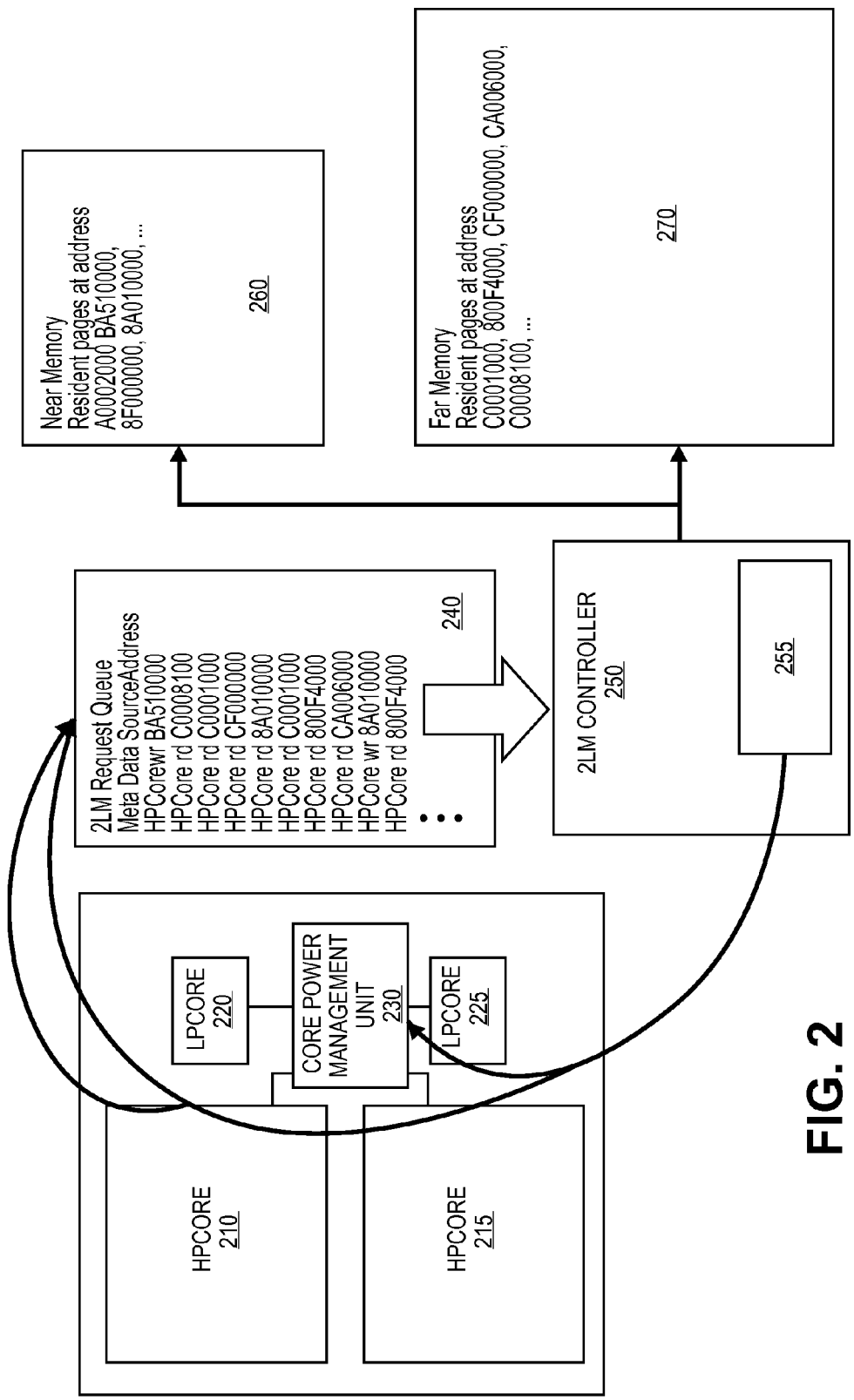
FIG. 2 is a block diagram of one embodiment of a technique to manage memory bandwidth in a 2LM architecture.

FIG. 2 is a block diagram of one embodiment of a technique to manage memory bandwidth in a 2 LM architecture. The example of FIG. 2 includes a specific number of processing cores; however, any number of processing cores may be supported. Further, many different types of memory can be supported for use as near or far memory.

In one embodiment, the system includes two high-powered cores (e.g., HP core 210, HP core 215) and two low-powered cores (LP core 220, LP core 225). The cores are coupled with core power management unit 230. Memory requests from the cores are collected by 2LM request queue 240, which operates with 2LM controller 250 to manage memory requests to both near and far memory (260 and 270, respectively). In one embodiment, 2LM controller 250 includes far memory bandwidth monitor 255 that communicates with core power management unit 230 to manage bandwidth utilization to far memory 270.

In one embodiment, a requesting core (e.g., 210, 215, 220, 225) is notified that it will experience increased latency for completion of memory requests. By increasing the memory latency, the requesting core can be placed in a lower performance mode where performance is better matched to the bandwidth provided to far memory and the corresponding higher latency.

In one embodiment, far memory bandwidth monitor 255 analyzes metadata in the memory request (e.g., flags) from core power management unit 230 to determine expected read latencies. This allows core power management unit 230 to determine whether to move a requesting process from a high power core (e.g., 210, 215) to a lower power core (e.g., 220, 225) to better match the operation of the core with the bandwidth and latency of the far memory.

In one embodiment, using device identifier metadata, the scheduling of far memory requests can be optimized by 2LM controller 250 so as to minimize the impact of a rogue thread/device generating excessive far memory traffic. There exists the possibility of a processing core generating an excessive amount of near memory misses such that other well behaving devices/threads have near memory misses that get delayed or starved by the far memory controller. The result is increased read latency. In one embodiment, scheduling is optimized by providing a higher priority utilizing, for example, ordering or prioritizing rules, to benefit devices/threads not generating high near memory misses.

In one embodiment, metadata is provided that allows for compression of far memory writes that demonstrate repeatable patterned data. For example, in a 2LM system using phase change memory, the power consumed in writes to the phase change memory is much higher than writes to DRAM and power savings can be realized from minimizing writes to the phase change memory.

In one embodiment, it is possible to maintain sectors and pages of memory where the data resident is repetitive. Rather than write the full data pattern to the sector/page, a pattern tag or other data structure is added in the far memory controller to identify these patterns for write operations. This allows the far memory controller to only write the pattern, not the full sector/page. This is particularly beneficial for the case where the operating system or an application is initializing a structure to a known state.

The initialized state is often a repeatable pattern that exists for all of the common data structure across sectors and pages. For example, the far memory controller can receive a memory write for three dwords {00000001h, 00000012h, 0000000ch}. In one embodiment, the far memory interface header can include the information that the write is to be repeated a specified number of times (e.g., 1000). The far memory controller can then tag the page where the data is to be written as a page with repeated data and write only the data pattern to the far memory page. In this example, a 3,000 dword write can then be compressed to a single three-dword write to far memory.

In one embodiment, the far memory bandwidth monitor resides in the 2LM controller that advertises the running far memory bandwidth, for example, in a status register that is accessible by processing cores. Additional circuitry/logic can be provided to allow for an interrupt to be generated when the far memory bandwidth exceeds a programmable threshold over a given period of time (e.g., average bandwidth over time). This allows the operating system to react to the excessive bandwidth in a way that is best for current operation.

In many cases the operating system may have additional information regarding applications/threads which are bad actors and generating an unbalanced bandwidth utilization. These applications/threads can be reconfigured, scaled back, or killed by the operating system. Hardware support can also be provided to support this functionality without operating system interaction. In one embodiment, the 2LM controller can detect excessive far bandwidth usage and reduce the advertised available far memory bandwidth to cause the operating system or other host system entity to modify application/thread behavior.

One or more of the following techniques can be utilized to reduce the size of far memory advertised to the operating system to dynamically scale far memory bandwidth utilization. In one embodiment, a channel can be removed or added and near memory contents can be remapped to support the available channels. In one embodiment, near memory DRAM can be configured to a reduced page size. The near memory can then be mapped to the new page size. The 2LM controller can include a tag cache that is used to extract the near memory utilization by implementing a page age field. When the page age logic detects that the near memory utilization drops below a threshold (e.g., half, two-thirds, one-third), the near memory size can be reduced and remapped.

Figure 3:
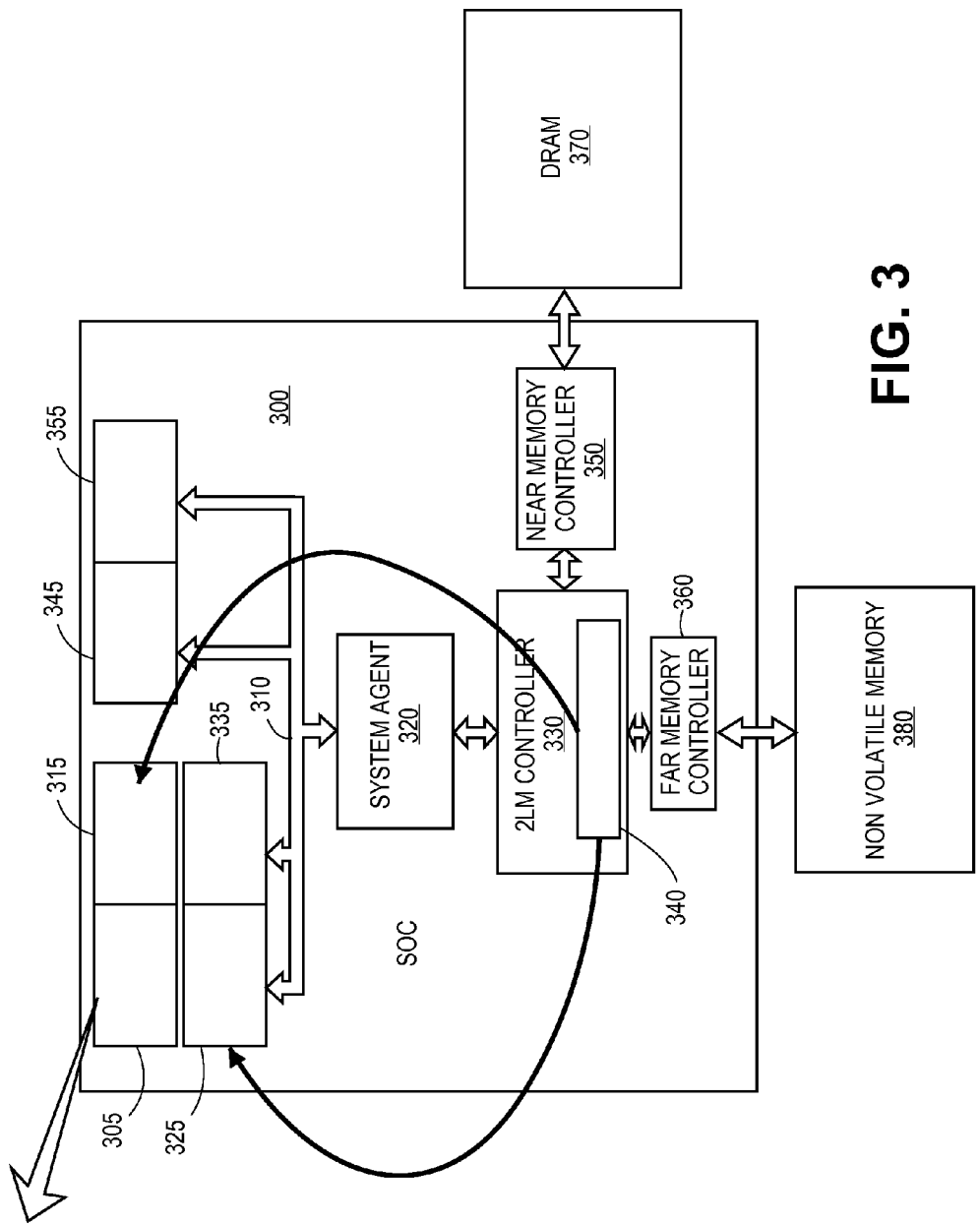
FIG. 3 is a block diagram of one embodiment of a system on a chip (SoC) architecture having a 2LM memory.

FIG. 3 is a block diagram of one embodiment of a system on a chip (SoC) architecture having a 2LM memory. SoC 300 is only one example of a system that may utilize far memory bandwidth management as described herein. SoC 300 may be part of a mobile computing/communications platform, for example, a tablet computing device, a mobile phone/smartphone or other electronic system.

SoC 300 can include any number of processing cores. The example of FIG. 3 includes four processing cores (e.g., 305, 315, 325, 335) and two general processing units (e.g., 345, 355). The processing cores and general processing units are interconnected by bus 310, which can be any type of interconnection mechanism known in the art. One or more of the processing cores and/or one or more of the general processing units may be coupled with input/output (I/O) devices 390. I/O devices 390 can include one or more of a touchscreen device, a monitor or other display, any type of cursor control device, a camera, a microphone, etc.

Bus 310 couples the processing cores and/or processing units to system agent 320, which operates to, at least, provide an interface to the memory subsystem. In one embodiment, system agent 320 is coupled to 2LM controller 330, which operates to control memory accesses to volatile memory (e.g., DRAM 370) and non-volatile memory (e.g., 380). In one embodiment, 2LM controller 330 includes far memory bandwidth monitor logic 340, which operates to monitor bandwidth and bandwidth utilization to at least non-volatile memory 380.

In one embodiment, 2LM controller 330 is coupled with far memory controller 360, which operates as a memory controller for non-volatile memory 380 and accesses involving non-volatile memory 380. In one embodiment, 2LM controller 330 is also coupled with near memory controller 350, which operates as a memory controller for volatile memory 370 and accesses involving volatile memory 370.

In one embodiment, far memory bandwidth monitor 340 operates to provide feedback to processing agents (e.g., 305, 315, 325, 335, 345, 355) that make memory requests to indicate that an increased latency due to near memory misses can be expected. This allows the processing agents to enter a lower performance state, which generally is a lower power consuming state, and better balances the performance and bandwidth for the system.

In one embodiment, far memory bandwidth information is passed via one or more mechanisms including, for example, status registers, interrupts, memory advertisements, control signaling, etc. This information can be utilized to move from lower power conditions to higher power conditions as well as from higher power conditions to lower power conditions.

Figure 4:
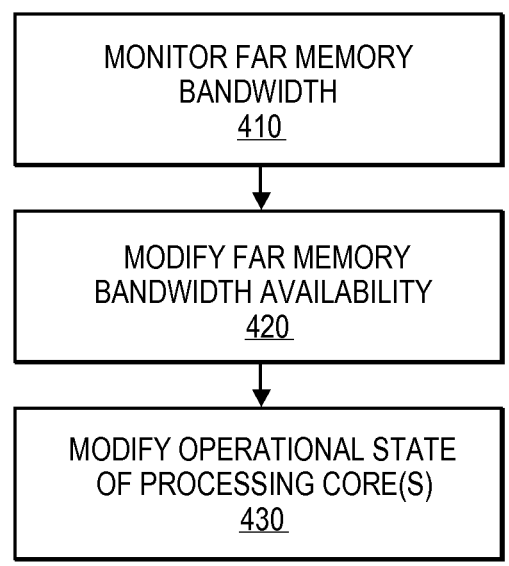
FIG. 4 is a flow diagram of one embodiment of a technique for managing memory bandwidth in a 2LM architecture.

FIG. 4 is a flow diagram of one embodiment of a technique for managing memory bandwidth in a 2LM architecture. In one embodiment, managing far memory bandwidth includes monitoring, in a two-level memory (2LM) system, far memory bandwidth utilization at least a far memory, 410. Available far memory bandwidth availability is dynamically modified based on monitored far memory bandwidth utilization, 420. The operational state of at least one processing core is dynamically modified in response to modification of available far memory bandwidth, 430.

In one embodiment, the far memory comprises a phase change memory. In alternate embodiments, other types of non-volatile memory can be used to provide the far memory including, for example, nanowire memory, ferroelectric transistor (FeTran) memory, stacked phase change memory/ phase change memory and switch (PCMS). In one embodiment, dynamically modifying the operational state of at least one processing core comprises changing a power state of the processing core.

In one embodiment, the system further selectively modifies an execution state of a thread utilizing excessive bandwidth. In one embodiment, selectively modifying an execution state of a thread comprises an operating system is terminating the thread.

In one embodiment, modifying available far memory bandwidth availability in based on monitored far memory bandwidth utilization comprises modifying an advertised available far memory bandwidth. In one embodiment, modifying available far memory bandwidth availability in based on monitored far memory bandwidth utilization comprises changing a number of channels available to transmit data to/from the far memory.

In one embodiment, modifying available far memory bandwidth availability based on monitored far memory bandwidth utilization comprises modifying a page size for near memory. In one embodiment, increasing the page size for the near memory in response to near memory utilization exceeding a preselected near memory utilization threshold. In one embodiment, In one embodiment, data to be written to the far memory is compressed.

In one embodiment, a system includes a plurality of processing cores capable of operating in at least two operational states having differing power consumption levels, a volatile memory device, a non-volatile memory device, and a memory system controller coupled with the plurality of processing cores. The volatile memory device and the non-volatile memory device. The memory system controller to manage the volatile memory device and the non-volatile memory device as a two-level memory (2LM). The volatile memory operates as near memory and the non-volatile memory operates as far memory, to monitor far memory bandwidth utilization at least the far memory, and to dynamically modify available far memory bandwidth availability based on monitored far memory bandwidth utilization. The operational state of at least one processing core is dynamically modified in response to modification of available far memory bandwidth.

In one embodiment, the system further includes a touchscreen interface coupled to provide output in response to commands from at least one of the processing cores. In one embodiment, the far memory comprises a phase change memory. In one embodiment, the memory system controller further selectively modifies an execution state of a thread utilizing excessive bandwidth. In one embodiment, the system selectively modifies an execution state of a thread comprises an operating system terminating the thread.

In one embodiment, modifying available far memory bandwidth availability in based on monitored far memory bandwidth utilization comprises modifying an advertised available far memory bandwidth. In one embodiment, modifying available far memory bandwidth availability in based on monitored far memory bandwidth utilization comprises changing a number of channels available to transmit data to/from the far memory. In one embodiment, modifying available far memory bandwidth availability in based on monitored far memory bandwidth utilization comprises modifying a page size for near memory. In one embodiment, the memory system controller increases the page size for the near memory in response to near memory utilization exceeding a preselected near memory utilization threshold. In one embodiment, the memory system controller compresses data to be written to the far memory.

In one embodiment, an apparatus includes a plurality of processing cores capable of operating in at least two operational states having differing power consumption levels and a memory system controller coupled with the plurality of processing cores, the memory system controller to control communication with a volatile memory device and a non-volatile memory device. The memory system controller to manage the volatile memory device and the non-volatile memory device as a two-level memory (2LM). The volatile memory operates as near memory and the non-volatile memory operates as far memory, to monitor far memory bandwidth utilization at least the far memory, and to dynamically modify available far memory bandwidth availability based on monitored far memory bandwidth utilization. The operational state of at least one processing core is dynamically modified in response to modification of available far memory bandwidth.

In one embodiment, the far memory comprises a phase change memory. In one embodiment, the memory system controller further selectively modifies an execution state of a thread utilizing excessive bandwidth. In one embodiment, selectively modifying an execution state of a thread comprises an operating system terminating the thread.

In one embodiment, modifying available far memory bandwidth availability in based on monitored far memory bandwidth utilization comprises modifying an advertised available far memory bandwidth. In one embodiment, modifying available far memory bandwidth availability in based on monitored far memory bandwidth utilization comprises changing a number of channels available to transmit data to/from the far memory. In one embodiment, modifying available far memory bandwidth availability in based on monitored far memory bandwidth utilization comprises modifying a page size for near memory. In one embodiment, the memory system controller increases the page size for the near memory in response to near memory utilization exceeding a preselected near memory utilization threshold. In one embodiment, the memory system controller compresses data to be written to the far memory.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   monitoring, in a two-level memory (2LM) system, far memory bandwidth utilization at least a far memory;
   dynamically modifying available far memory bandwidth availability in based on monitored far memory bandwidth utilization; and
   dynamically modifying the operational state of at least one processing core in response to modification of available far memory bandwidth.

2. The method of claim 1 wherein the far memory comprises a phase change memory.

3. The method of claim 1 wherein dynamically modifying the operational state of at least one processing core comprises changing a power state of the processing core.

4. The method of claim 1 further comprising selectively modifying an execution state of a thread utilizing excessive bandwidth.

5. The method of claim 4 wherein selectively modifying an execution state of a thread comprises an operating system terminating the thread.

6. The method of claim 1 wherein modifying available far memory bandwidth availability in based on monitored far memory bandwidth utilization comprises modifying an advertised available far memory bandwidth.

7. The method of claim 1 wherein modifying available far memory bandwidth availability in based on monitored far memory bandwidth utilization comprises changing a number of channels available to transmit data to/from the far memory.

8. The method of claim 1 wherein modifying available far memory bandwidth availability in based on monitored far memory bandwidth utilization comprises modifying a page size for near memory.

9. The method of claim 8 further comprising increasing the page size for the near memory in response to near memory utilization exceeding a preselected near memory utilization threshold.

10. The method of claim 1 further comprising compressing data to be written to the far memory.

11. A system comprising:
    a touchscreen interface;
    a plurality of processing cores capable of operating in at least two operational states having differing power consumption levels, the plurality of processing cores to at least provide a graphical user interface on the touchscreen interface;
    a volatile memory device;
    a non-volatile memory device;
    a memory system controller coupled with the plurality of processing cores, the volatile memory device and the non-volatile memory device, the memory system controller to manage the volatile memory device and the non-volatile memory device as a two-level memory (2LM), wherein the volatile memory operates as near memory and the non-volatile memory operates as far memory, to monitor far memory bandwidth utilization at least the far memory, and to dynamically modify available far memory bandwidth availability based on monitored far memory bandwidth utilization;
    wherein the operational state of at least one processing core is dynamically modified in response to modification of available far memory bandwidth.

12. An apparatus comprising:
    a plurality of processing cores capable of operating in at least two operational states having differing power consumption levels;
    a memory system controller coupled with the plurality of processing cores, the memory system controller to control communication with a volatile memory device and a non-volatile memory device, the memory system controller to manage the volatile memory device and the non-volatile memory device as a two-level memory (2LM), wherein the volatile memory operates as near memory and the non-volatile memory operates as far memory, to monitor far memory bandwidth utilization at least the far memory, and to dynamically modify available far memory bandwidth availability based on monitored far memory bandwidth utilization;
    wherein the operational state of at least one processing core is dynamically modified in response to modification of available far memory bandwidth.

13. The apparatus of claim 12 wherein the far memory comprises a phase change memory.

14. The apparatus of claim 12, wherein the memory system controller further selectively modifies an execution state of a thread utilizing excessive bandwidth.

15. The apparatus of claim 14 wherein selectively modifying an execution state of a thread comprises an operating system terminating the thread.

16. The apparatus of claim 12 wherein modifying available far memory bandwidth availability in based on monitored far memory bandwidth utilization comprises modifying an advertised available far memory bandwidth.

17. The apparatus of claim 12 wherein modifying available far memory bandwidth availability in based on monitored far memory bandwidth utilization comprises changing a number of channels available to transmit data to/from the far memory.

18. The apparatus of claim 12 wherein modifying available far memory bandwidth availability in based on monitored far memory bandwidth utilization comprises modifying a page size for near memory.

19. The apparatus of claim 18, wherein the memory system controller increases the page size for the near memory in response to near memory utilization exceeding a preselected near memory utilization threshold.

20. The apparatus of claim 12, wherein the memory system controller compresses data to be written to the far memory.

\* \* \* \* \*